United States Patent
Dettinger et al.

(10) Patent No.: US 7,624,098 B2
(45) Date of Patent: Nov. 24, 2009

(54) GENERATING SUITABLE DATA FOR STATISTICAL ANALYSIS

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 11/246,828

(22) Filed: Oct. 7, 2005

(65) Prior Publication Data

US 2007/0083495 A1 Apr. 12, 2007

(51) Int. Cl.
*G06F 17/30* (2006.01)
*G06F 17/00* (2006.01)

(52) U.S. Cl. .................. 707/3; 707/1; 707/2; 707/4; 707/5; 707/100

(58) Field of Classification Search .............. 707/1, 707/10, 102, 2; 709/217
See application file for complete search history.

(56) References Cited

U.S. PATENT DOCUMENTS

| | | | | |
|---|---|---|---|---|
| 5,544,281 A * | 8/1996 | Maruoka et al. | ............... | 706/58 |
| 5,724,262 A * | 3/1998 | Ghahramani | ................ | 702/186 |
| 5,832,496 A * | 11/1998 | Anand et al. | ................ | 707/102 |
| 6,496,817 B1 * | 12/2002 | Whang et al. | .................. | 707/2 |
| 6,725,227 B1 | 4/2004 | Li | | |
| 2003/0125988 A1 * | 7/2003 | Rao et al. | ...................... | 705/3 |
| 2003/0135124 A1 * | 7/2003 | Russell | ....................... | 600/500 |
| 2003/0169284 A1 * | 9/2003 | Dettinger et al. | ............ | 345/708 |

OTHER PUBLICATIONS

U.S. Appl. No. 10/083,075, "Application Portability and Extensibility Through Database Schema and Query Abstraction", filed Feb. 26, 2002.
U.S. Appl. No. 11/035,710, "Timeline Condition Support for an Astract Databas", filed Jan. 14, 2005.
U.S. Appl. No. 11/083,208, "Sequence Support Operators for an Abstract Database", filed Mar. 17, 2005.

* cited by examiner

*Primary Examiner*—Yicun Wu
*Assistant Examiner*—Yu Zhao
(74) *Attorney, Agent, or Firm*—Patterson & Sheridan, LLP

(57) ABSTRACT

A method, system and article of manufacture for processing abstract queries and, more particularly, for generating input to statistical analysis routines. One embodiment comprises receiving an abstract query including a measurement field and a chronological reference condition. The abstract query is transformed into an executable query which is executed by a query engine, whereby result data is determined including an available measurement value for the measurement field. The available measurement value was taken at a point in time different from a point in time that satisfies the chronological reference condition. The method further comprises determining a variance value corresponding to a time variance between the point in time that satisfies the chronological reference condition and the other point in time at which the available measurement value was taken. As a result set for the abstract query, the available measurement value and the variance value are returned.

9 Claims, 9 Drawing Sheets

US 7,624,098 B2

GENERATING SUITABLE DATA FOR STATISTICAL ANALYSIS

CROSS-RELATED APPLICATIONS

This application is related to the following commonly owned applications: U.S. patent application No. 10/083,075, now U.S. Pat. No. 6,996,558 filed Feb. 26, 2002, entitled "APPLICATION PORTABILITY AND EXTENSIBILITY THROUGH DATABASE SCHEMA AND QUERY ABSTRACTION", U.S. patent application No. 11/035,710, filed Jan. 14, 2005, entitled "TIMELINE CONDITION SUPPORT FOR AN ABSTRACT DATABASE" and U.S. patent application No. 11/083,208, filed Mar. 17, 2005, entitled "SEQUENCE SUPPORT OPERATORS FOR AN ABSTRACT DATABASE", which are hereby incorporated herein in their entirety.

BACKGROUND OF THE INVENTION

1. Field of the Invention

The present invention generally relates to generation of suitable data for statistical analysis and, more particularly, to generating query output which is suitable as input to statistical analysis routines.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Data that is collected and stored in a database can be used for various purposes including know-how management, decision making and statistical analysis. Statistical analysis on data in an underlying database is generally performed by executing suitable analysis routines on query results obtained in response to execution of corresponding queries against the underlying database. Such analysis routines normally require a set of variables as input, which are often measurements that are carried out at specific points in time. However, in some cases the required data may not be available. For example, in retrospective studies which are performed once all data required as input to corresponding analysis routines was collected, data with respect to a given field may not be chronologically standardized, i.e., certain events for various instances of a given entity did not occur with same frequency. In other words, the available data in the underlying database may not match, from a chronological perspective, the needed data that corresponding analysis routines require as input to perform a required statistical analysis.

For instance, assume an analysis routine that is configured to analyze medical data in order to determine whether a given drug X produces satisfactory results in cancer treatment. More specifically, assume that in the context of a medical test series the drug X was administered to 10 patients having a particular tumor which is presumed to be treatable using the drug X. At the time of administration of the drug X, the tumor size is initially measured for each of the 10 patients. Then, the tumor size of each of the 10 patients is measured in follow-up examinations at various intervals in order to track the progress of the tumors. Corresponding tumor size measurements are collected and stored in a database. These tumor size measurements can be retrieved from the database for statistical analysis purposes by issuing a suitable query against the database.

Assume now that in the given example the analysis routine is configured to determine an average tumor reduction for all patients after one month, two months and one year after administration of the drug X. However, for various reasons tumor size measurements were not carried out for all patients exactly one month, two months and/or one year after administration of the drug X. Accordingly, if the analysis routine is run on a query result which only returns a list of available tumor size measurements for each patient from the database, the results produced by the analysis routine can be inaccurate and invalid.

Therefore, there is a need for an effective technique for generating query output which is suitable as input to statistical analysis routines.

SUMMARY OF THE INVENTION

The present invention generally is directed to a method, system and article of manufacture for processing abstract queries and, more particularly, to generating query output which is suitable as input to statistical analysis routines.

One embodiment provides a computer-implemented method of generating input to statistical analysis routines after execution of a query against a database. The method comprises receiving an abstract query against a database, the abstract query comprising a value request defined by a measurement field and a chronological reference condition, and configured to return at least one measurement value taken for the measurement field at a point in time that satisfies the chronological reference condition. The abstract query is transformed into an executable query capable of being executed by a query engine. The executable query is executed, whereby result data is determined including an available measurement value for the measurement field. The available measurement value was taken at another point in time different from the point in time that satisfies the chronological reference condition. The method further comprises determining a variance value corresponding to a time variance between the point in time that satisfies the chronological reference condition and the other point in time at which the available measurement value was taken. As a result set for the abstract query, the available measurement value and the variance value are returned.

Another embodiment provides a computer-readable medium containing a program which, when executed by a processor, performs operations for generating input to statistical analysis routines after execution of a query against a database. The operations comprise receiving an abstract query against a database, the abstract query comprising a value request defined by a measurement field and a chronological reference condition, and configured to return at least one measurement value taken for the measurement field at a point in time that satisfies the chronological reference condition. The abstract query is transformed into an executable query capable of being executed by a query engine. The executable query is executed, whereby result data is determined including an available measurement value for the measurement field. The available measurement value was taken at another point in time different from the point in time that satisfies the chronological reference condition. The operations further comprise determining a variance value corresponding to a time variance between the point in time that satisfies the chronological reference condition and the other point in time at which the available measurement value was taken. As a result set for the abstract query, the available measurement value and the variance value are returned.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
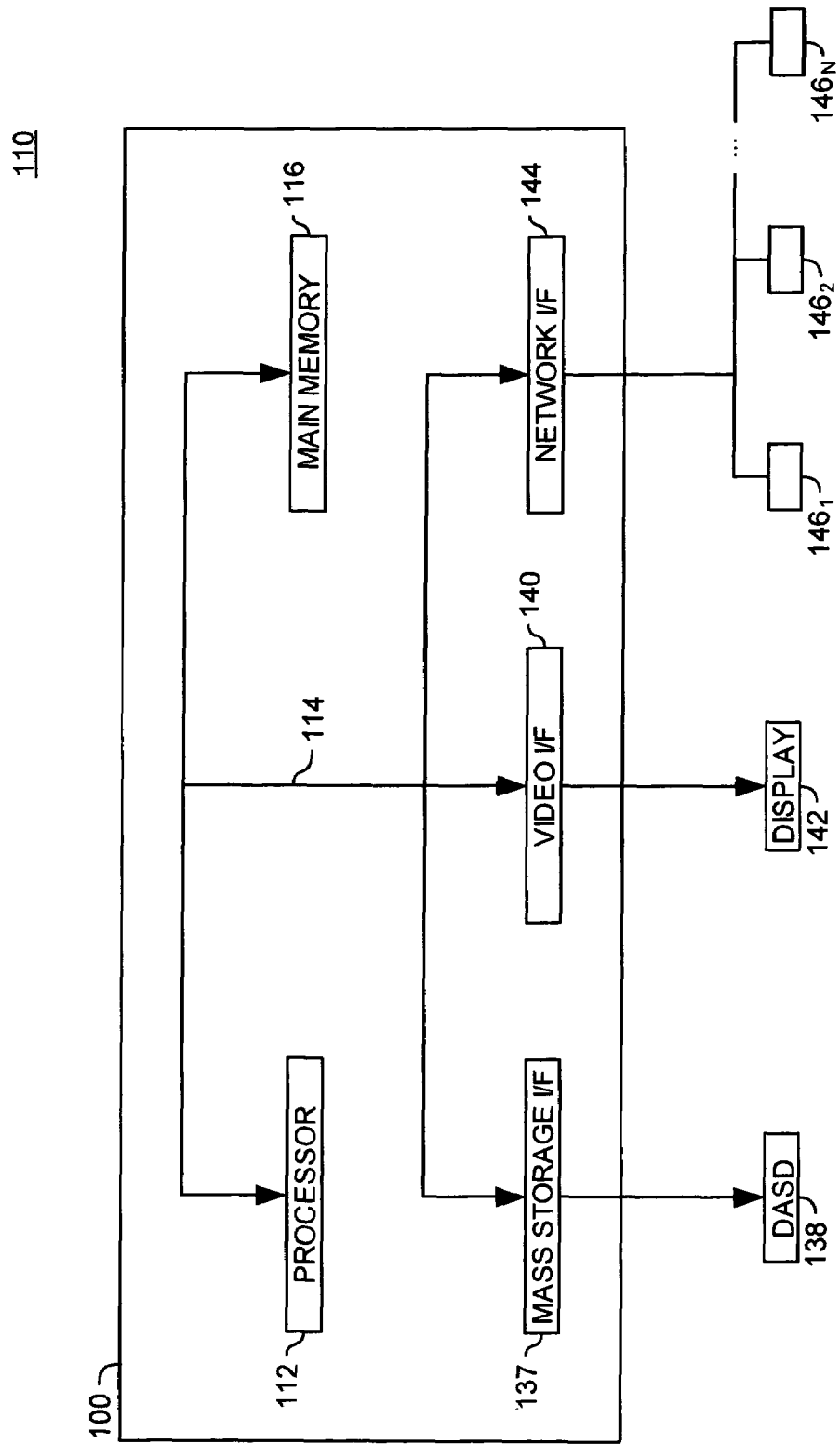
FIG. 1 is one embodiment of a computer system utilized in accordance with the invention.

The present invention is generally directed to a method, system and article of manufacture for processing abstract queries and, more particularly, to generating query output which is suitable as input to statistical analysis routines. In general, an abstract query against data in an underlying database is issued by a requesting entity, such as a user, and may include one or more measurement fields with associated chronological conditions. A measurement field is a result field for which various data values which are determined at different points in time can be collected. A chronological condition defines a data selection criterion which is satisfied by a requested point in time. By associating the measurement field with the chronological condition in the abstract query, specific values of the measurement field which were determined at the requested point in time can be selected from the underlying database. Accordingly, the query is executed against the database to obtain a result set having data for the measurement field(s). The result set can subsequently be used as input to an underlying statistical analysis routine to perform a required statistical analysis.

Statistical analysis routines generally require data that is represented as a set of chronologically standardized variables. In other words, certain events for various instances of a given measurement field need to occur with same frequency to make the various instances suitable for use with the underlying statistical analysis routine. However, according to one aspect, available data for the given measurement field in the underlying database does not match, from a chronological perspective, the needed data that the underlying statistical analysis routine requires as input to perform the required statistical analysis. Thus, suitable processing with respect to the available data needs to be performed in order to make the result set usable as input to the underlying statistical analysis routine.

In one embodiment, a variance value is calculated for each instance of the given measurement field and included with the result set. The variance value of a given instance identifies a time variance between a point in time when the instance actually occurred from a reference value, such as a predefined point in time. In one embodiment, the reference value is specified by the abstract query.

In the underlying statistical analysis routine, the variance values can be used, e,g., in a suitable regression equation which allows the routine to determine an approximated value for the given instance with respect to the reference value. Thus, the underlying statistical analysis routine can take into account how inaccurate each instance is with respect to the reference value when performing the required statistical analysis.

In the following, embodiments of the invention may be described with respect to abstract queries. However, it should be noted that the invention is not limited to abstract queries and that embodiments of the invention may use any suitable queries, known or unknown, in order to generate result data which is suitable as input to methods of the invention.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Query Creation and Execution Environment

Figure 2:
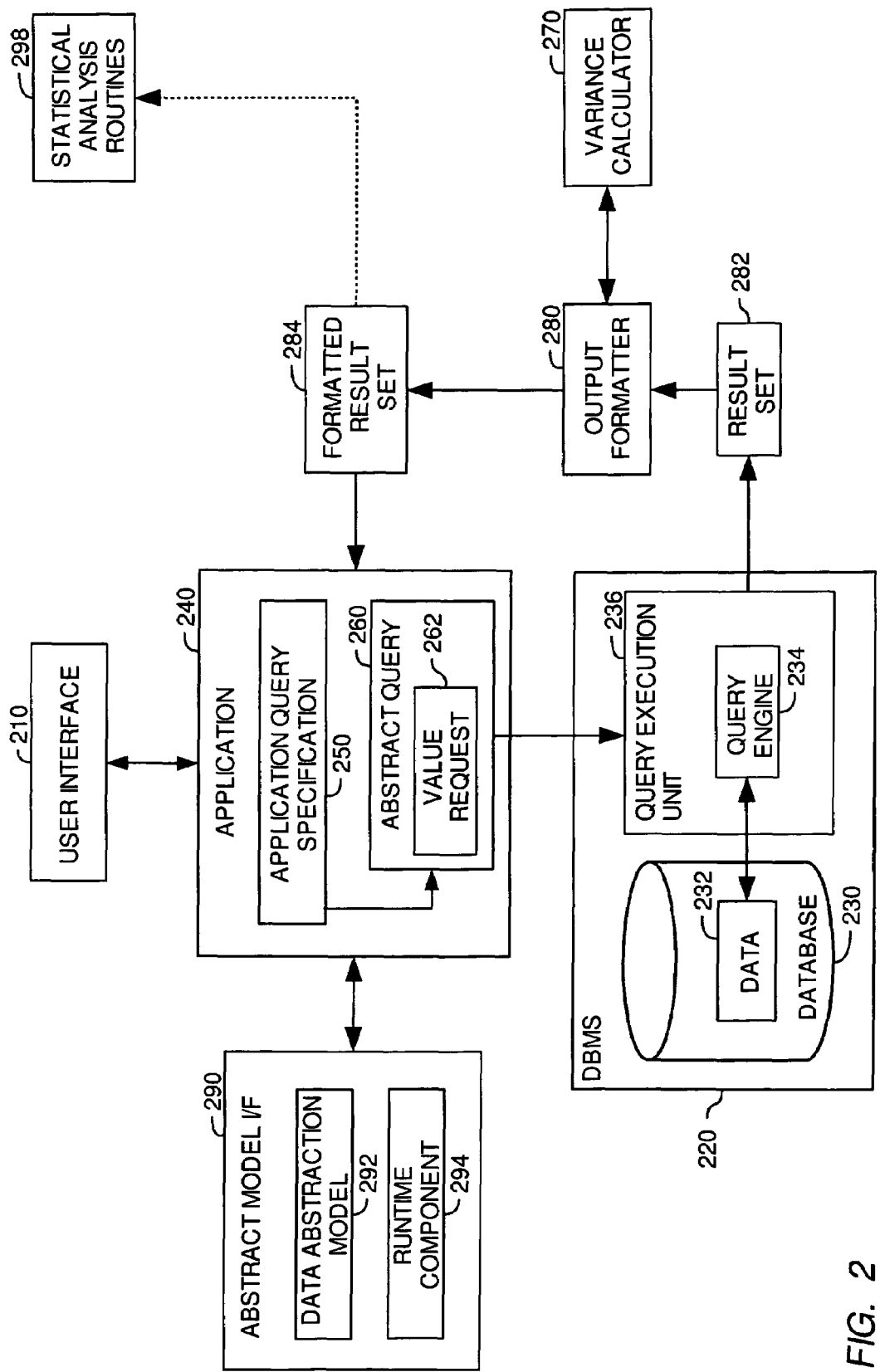
FIG. 2 is a relational view of software components of one embodiment of the invention.

Referring now to FIG. 2, a relational view of software components in one embodiment is illustrated. The software components illustratively include a user interface 210, a DBMS 220, one or more applications 240 (only one application is illustrated for simplicity), a variance calculator 270, an output formatter 280, an abstract model interface 290 and one or more statistical analysis routines 298. The DBMS 220 illustratively includes a database 230 and a query execution unit 236 having a query engine 234. The statistical analysis routines 298 are configured to perform a statistical analysis on data that is represented as a set of chronologically standardized variables.

The database 230 is shown as a single database having the data 232, for simplicity. However, the database 230 can also be implemented by multiple databases which can be distributed relative to one another. Moreover, one or more databases can be distributed to one or more networked devices (e.g., networked devices 146 of FIG. 1). The database 230 is representative of any collection of data regardless of the particular physical representation of the data. A physical representation of data defines an organizational schema of the data. By way of illustration, the database 230 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of the data 232.

According to one aspect, the application 240 (and more generally, any requesting entity including, at the highest level, users) issues queries against the data 232 in the database 230. In general, the queries issued by the application 240 are defined according to an application query specification 250 and may be predefined (i.e., hard coded as part of the application 240) or generated in response to input (e.g., user input). The application query specification(s) 250 is further described below with reference to FIGS. 3-6.

Illustratively, the queries issued by the application 240 are created by users using the user interface 210, which can be any suitable user interface configured to create/submit queries. According to one aspect, the user interface 210 is a graphical user interface. However, it should be noted that the user interface 210 is only shown by way of example; any suitable requesting entity may create and submit queries against the database 230 (e.g., the application 240, an operating system or an end user). Accordingly, all such implementations are broadly contemplated.

In one embodiment, the requesting entity accesses a suitable database connectivity tool such as a Web application, an Open DataBase Connectivity (ODBC) driver, a Java DataBase Connectivity (JDBC) driver or a Java Application Programming Interface (Java API) for creation of a query. A Web application is an application that is accessible by a Web browser and that provides some function beyond static display of information, for instance by allowing the requesting entity to query the database 230. An ODBC driver is a driver that provides a set of standard application programming interfaces to perform database functions such as connecting to the database 230, performing dynamic SQL functions, and committing or rolling back database transactions. A JDBC driver is a program included with a database management system (e.g., DBMS 220) to support JDBC standard access between the database 230 and Java applications. A Java API is a Java-based interface that allows an application program (e.g., the requesting entity, the ODBC or the JDBC) that is written in a high-level language to use specific data or functions of an operating system or another program (e.g., the application 240).

Accordingly, the queries issued by the application 240 can be in physical form, such as SQL and/or XML queries, which are consistent with the physical representation of the data 232 for execution against the database 230. Alternatively, the queries issued by the application 240 are composed using the abstract model interface 290. Such queries are referred to herein as "abstract queries". The abstract model interface 290 is further described below with reference to FIGS. 3-6. The abstract queries are transformed into a form consistent with the physical representation of the data 232 for execution against the database 230. In the illustrated example, an abstract query 260 is created on the basis of logical fields defined by a data abstraction model 292. The abstract query 260 illustratively includes a value request 262. The value request 262 is defined by a measurement field and a chronological condition which specifies a requested point in time at which values for the measurement field should have been taken. In other words, the abstract query 260 is configured to retrieve at least one measurement value for the measurement field which was taken at a point in time that satisfies the chronological condition.

In one embodiment, the abstract query 260 is translated by a runtime component 294 into a concrete (i.e., executable) query. The executable query is submitted to the query execution unit 236 for execution. It should be noted that the query execution unit 236 illustratively only includes the query engine 234, for simplicity. However, the query execution unit 236 may include other components, such as a query parser and a query optimizer. A query parser is generally configured to accept a received query input from a requesting entity, such as the application(s) 240, and then parse the received query. The query parser may then forward the parsed query to the query optimizer for optimization. A query optimizer is an application program which is configured to construct a near optimal search strategy for a given set of search parameters, according to known characteristics of an underlying database (e.g., the database 230), an underlying system on which the search strategy will be executed (e.g., computer system 110 of FIG. 1), and/or optional user specified optimization goals. But not all strategies are equal and various factors may affect the choice of an optimum search strategy. However, in general such search strategies merely determine an optimized use of available hardware/software components to execute respective queries. The query optimizer may then forward the optimized query to the query engine 234 for execution.

Illustratively, the executable query is executed by the query engine 234 against the data 232 of the database 230 to determine a result set 282 for the abstract query 260. The result set 282 includes result data for the measurement field defined by the value request 262. According to one aspect, the result data is composed of measurement values for the measurement field which are not chronologically standardized. In other words, certain events for different measurement values of the result data for the measurement field occurred at points in time which do not satisfy an underlying chronological condition defined by the value request 262.

In one embodiment, the query engine 234 calculates a variance value for each measurement value of the result data in order to allow use of the measurement values with the statistical analysis routines 298. It should be noted that in the illustrated example calculation of the variance values is not explicitly requested by the abstract query 260. Instead, the calculation can be requested by the requesting entity, e.g., by a user using the user interface 210. For instance, the user interface 210 can be a graphical user interface having a graphical selection element such as a checkbox which allows the user to request calculation of the variance values. Alternatively, the user may use the user interface 210 to specify that the abstract query 260 is executed to retrieve data for a statistical analysis using the statistical analysis routines 298. In this case, the query engine 234 (or some other component) can determine whether the statistical analysis routines 298 require the variance values and, if so, perform the calculation automatically. All such implementations are broadly contemplated.

The variance value for a given measurement value corresponds to a time variance between the requested point in time that satisfies an underlying chronological condition and the point in time at which the given measurement value was taken. The time variance can be used in a suitable regression equation of one of the statistical analysis routines 298 in order to determine an approximated value for the given measurement value with respect to the requested point in time that satisfies the underlying chronological condition. Accordingly, for each retrieved measurement value included with the result data a corresponding variance value is calculated and included with the result set 282 before outputting the result set 282 to the application(s) 240.

In another embodiment, which is illustrated in FIG. 2 by way of example, the result set 282 does not include any variance values. Instead, the result set 282 includes timestamps which define points in time when the retrieved measurement values for the measurement field were taken. In this case, the result set 282 can be a temporarily stored data object which is suitable to determine the variance values. Accordingly, the temporarily stored result set 282 is processed by the output formatter 280 in order to create a formatted result set 284 which is suitable as input to statistical analysis routines 298. The formatted result set 284 includes the result set 282 and associated variance values which are determined by the variance calculator 270. More specifically, the variance calculator 270 calculates a variance value for a given measurement value on the basis of the requested point in time that satisfies an underlying chronological condition and the timestamp of the given measurement value. The output formatter 280 then includes all measurement values and calculated variance values into the formatted result set 284, which is returned to the application(s) 240. As was noted above, the formatted result set 284 is suitable as input to the statistical analysis routines 298.

An exemplary method for managing execution of the abstract query 260 to generate suitable input to the statistical analysis routines 298 is described in more detail below with reference to FIG. 7. An exemplary method for calculating variance values using the variance calculator 270 is described in more detail below with reference to FIG. 8. An exemplary timeline showing a plurality of illustrative events with respect to the value request 262 is described in more detail below with reference to FIG. 9.

Logical/Runtime View of Environment

Figure 3:
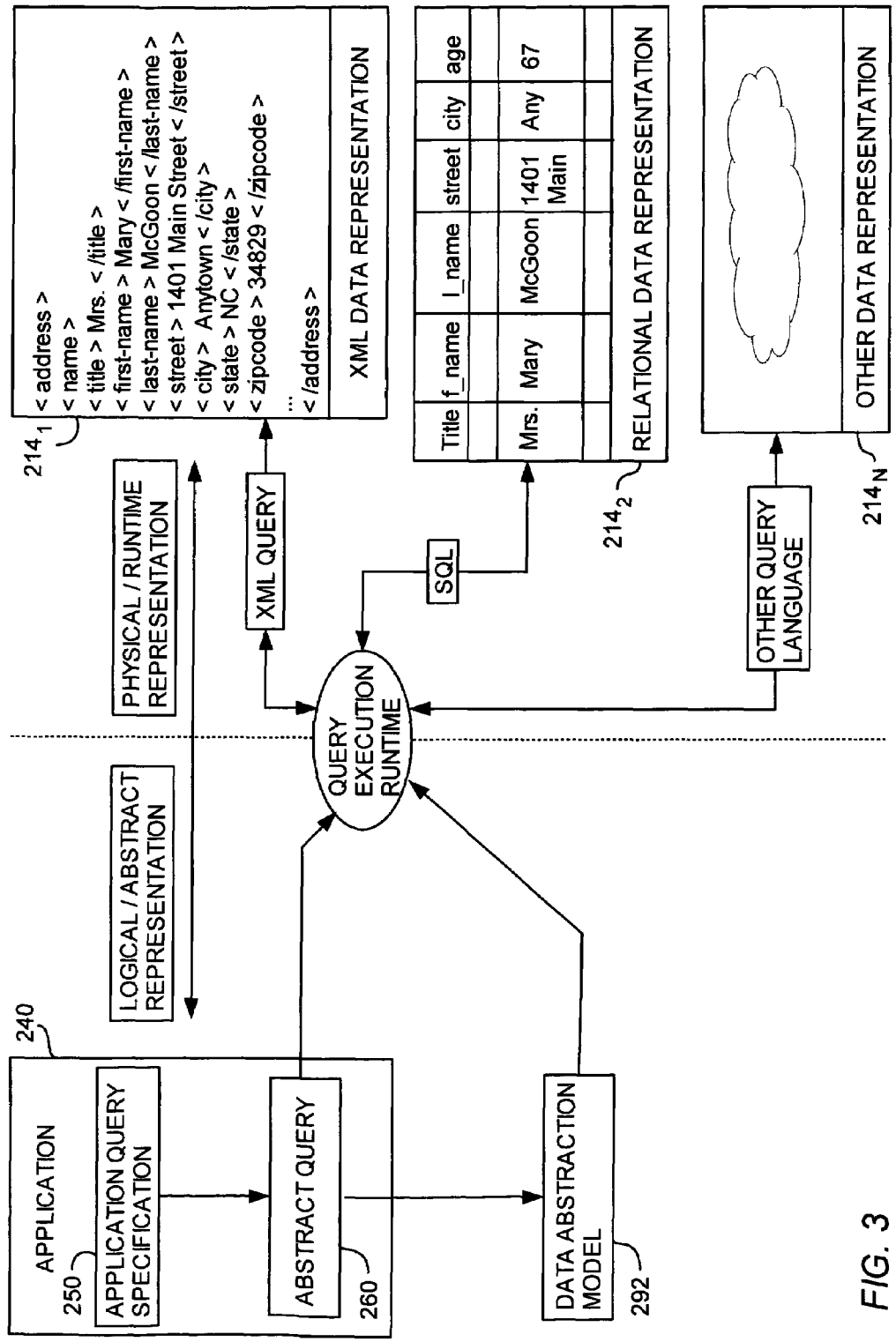
FIGS. 3-4 are relational views of software components in one embodiment.
Figure 4:
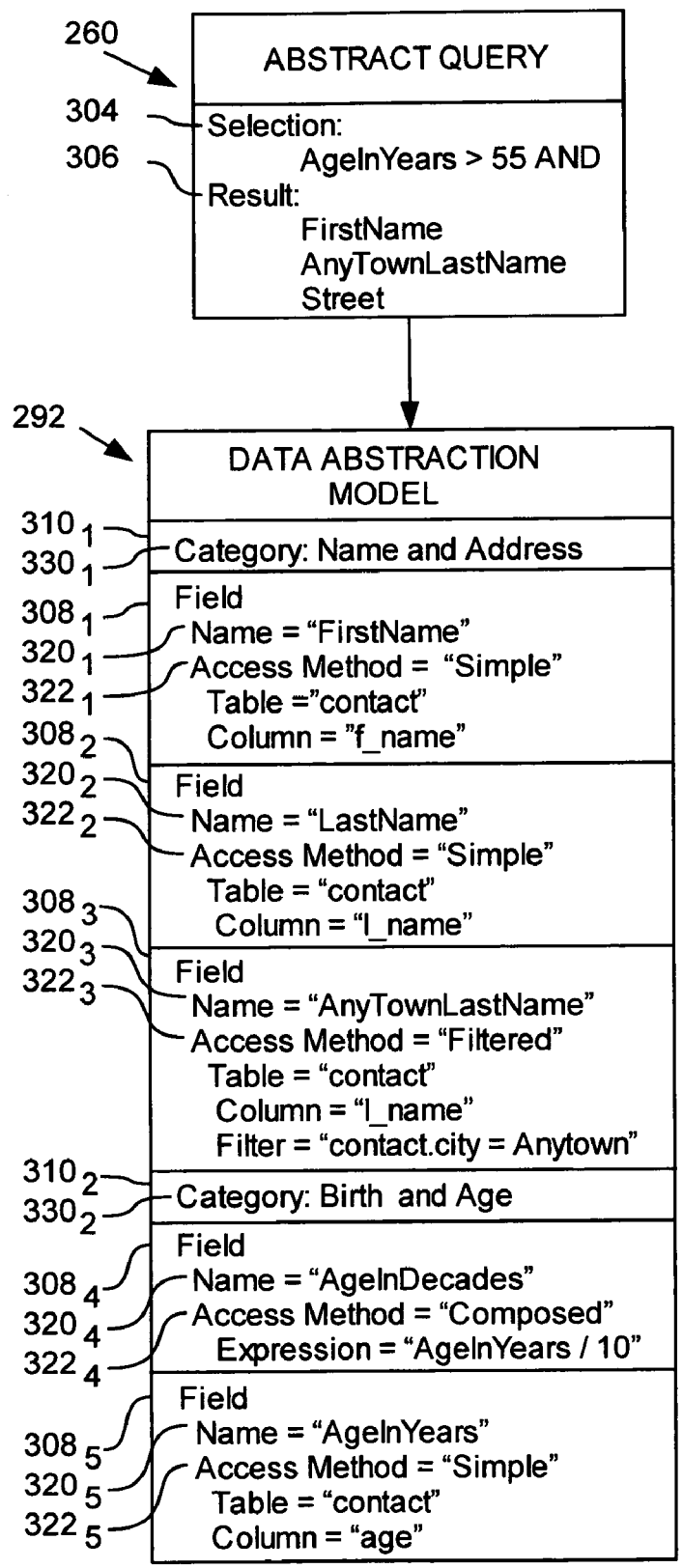

FIGS. 3-4 show an illustrative relational view of the applications 240, the application query specifications 250 and the data abstraction model 292 of FIG. 2 and other components of the invention. A requesting entity (e.g., one of the applications 240 or a user) issues the query 260 as defined by the respective application query specification 250 of the requesting entity. The resulting query 260 is generally referred to herein as an "abstract query" because the query is composed according to abstract (i.e., logical) fields rather than by direct reference to the underlying physical data entities in the database 230 of FIG. 2. As a result, abstract queries may be defined that are independent of the particular underlying data representation used. In one embodiment, the application query specification 250 may include both criteria used for data selection (selection criteria 304) and an explicit specification of the fields to be returned (return data specification 306) based on the selection criteria 304, as illustrated in FIG. 4.

As was noted above, the logical fields specified by the application query specification 250 and used to compose the abstract query 260 are defined by the data abstraction model 292. In general, the data abstraction model 292 exposes information as a set of logical fields that may be used within a query (e.g., the abstract query 260) issued by the application 240 to specify criteria for data selection and specify the form of result data returned from a query operation. The logical fields are defined independently of the underlying data representation being used in a corresponding database (e.g., database 230 of FIG. 2), thereby allowing queries to be formed that are loosely coupled to the underlying data representation.

In one embodiment, illustrated in FIG. 4, the data abstraction model 292 comprises a plurality of field specifications 308$_1$, 308$_2$, 308$_3$, 308$_4$ and 308$_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute 320$_1$, 320$_2$, 320$_3$, 320$_4$, 320$_5$ (collectively, field name 320) and an associated access method attribute 322$_1$, 322$_2$, 322$_3$, 322$_4$, 322$_5$ (collectively, access methods 322). Each attribute may have a value. For example, logical field name attribute 320$_1$ has the value "FirstName" and access method attribute 322$_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute 322$_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

It should be noted that various other attributes are contemplated for the field specifications 308. Furthermore, each field specification may include particular metadata, such as timeline metadata. Providing field specifications with timeline data allows for creation of measurement fields in abstract queries, such as the abstract query 260. A measurement field is a result field that corresponds to a logical field of an underlying data abstraction model and that can be associated in an abstract query with a chronological condition that specifies a requested point in time for which values for the result field should be retrieved from an underlying database. More generally, timeline metadata can be used to order data elements for a logical field according to a chronological sequence. By way of example, commonly owned U.S. patent application Ser. No. 11/083,208, filed Mar. 17, 2005, entitled "SEQUENCE SUPPORT OPERATORS FOR AN ABSTRACT DATABASE", which is incorporated herein by reference in its entirety, describes timeline metadata which includes type metadata and time-ordering metadata. The timeline type metadata indicates that data retrieved for a given logical field may be ordered into a sequence of discrete events based on the order in which the events occurred, or when the data came into being. The time-ordering metadata specifies where to locate the data used to order data elements for the given logical field into a sequence. Other examples of timeline metadata are described in commonly owned U.S. patent application Ser. No. 11/035,710, filed Jan. 14, 2005 entitled, "TIMELINE CONDITION SUPPORT FOR AN ABSTRACT DATABASE", which is also incorporated herein by reference in its entirety.

In one embodiment, groups (i.e. two or more) of logical fields may be part of categories. Accordingly, the data abstraction model 292 includes a plurality of category specifications 310$_1$ and 310$_2$ (two shown by way of example), collectively referred to as the category specifications. In one embodiment, a category specification is provided for each logical grouping of two or more logical fields. For example, logical fields 308$_{1-3}$ and 308$_{4-5}$ are part of the category specifications 310$_1$ and 310$_2$, respectively. A category specification is also referred to herein simply as a "category". The categories are distinguished according to a category name, e.g., category names 330$_1$ and 330$_2$ (collectively, category name(s) 330). In the present illustration, the logical fields 308$_{1-3}$ are part of the "Name and Address" category and logical fields 308$_{4-5}$ are part of the "Birth and Age" category.

The access methods 322 generally associate (i.e., map) the logical field names to data in the database (e.g., database 230 of FIG. 2). As illustrated in FIG. 3, the access methods associate the logical field names to a particular physical data representation $214_1, 214_2, \ldots 214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 292 contains field specifications (with associated access methods) for two or more physical data representations 214. In an alternative embodiment, a different single data abstraction model 292 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 4 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 4 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 4 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 292 shown in FIG. 4 are representative of logical fields mapped to data represented in the relational data representation $214_2$ shown in FIG. 3. However, other instances of the data abstraction model 292 map logical fields to other physical representations, such as XML.

An illustrative abstract query corresponding to the abstract query 260 shown in FIG. 4 is shown in Table I below. By way of illustration, the illustrative abstract query is defined using XML. However, any other language may be used to advantage.

TABLE I

ABSTRACT QUERY EXAMPLE

| | |
|---|---|
| 001 | <?xml version="1.0"?> |
| 002 | <!--Query string representation: (AgeInYears > "55"--> |
| 003 | <QueryAbstraction> |
| 004 |   <Selection> |
| 005 |     <Condition internalID="4"> |
| 006 |     <Condition field="AgeInYears" operator="GT" value="55" |
| 007 |       internalID="1"/> |
| 008 |   </Selection> |
| 009 |   <Results> |
| 010 |     <Field name="FirstName"/> |
| 011 |     <Field name="AnyTownLastName"/> |
| 012 |     <Field name="Street"/> |
| 013 |   </Results> |
| 014 | </QueryAbstraction> |

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what in the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 292 shown in FIG. 4 is shown in Table II below. By way of illustration, the illustrative Data Abstraction Model is defined using XML. However, any other language may be used to advantage.

TABLE II

DATA ABSTRACTION MODEL EXAMPLE

| | |
|---|---|
| 001 | <?xml version="1.0"?> |
| 002 | <DataAbstraction> |
| 003 |   <Category name="Name and Address"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |     </Field> |
| 009 |     <Field queryable="Yes" name="LastName" displayable="Yes"> |
| 010 |       <AccessMethod> |
| 011 |         <Simple columnName="l_name" tableName="contact"></Simple> |
| 012 |       </AccessMethod> |
| 013 |     </Field> |

TABLE II-continued

DATA ABSTRACTION MODEL EXAMPLE

```
014        <Field queryable="Yes" name="AnyTownLastName" displayable="Yes">
015          <AccessMethod>
016            <Filter columnName="l_name" tableName="contact"
017                 "contact.city=Anytown"> </Filter>
018          </AccessMethod>
019        </Field>
020      </Category>
021      <Category name="Birth and Age">
022        <Field queryable="Yes" name="AgeInDecades" displayable="Yes">
023          <AccessMethod>
024            <Composed columnName="age" tableName="contact"
025                 Expression="columnName/10"> </Composed>
026          </AccessMethod>
027        </Field>
028        <Field queryable="Yes" name="AgeInYears" displayable="Yes">
029          <AccessMethod>
030            <Simple columnName="age" tableName="contact"></Simple>
031          </AccessMethod>
032        </Field>
033      </Category>
034    </DataAbstraction>
```

By way of example, note that lines 004-008 correspond to the first field specification $308_1$ of the DAM 292 shown in FIG. 4 and lines 009-013 correspond to the second field specification $308_2$.

As was noted above, the abstract query of Table I can be transformed into a concrete query for query execution. An exemplary method for transforming an abstract query into a concrete query is described below with reference to FIGS. 5-6.

Transforming an Abstract Query into a Concrete Query

Figure 5:
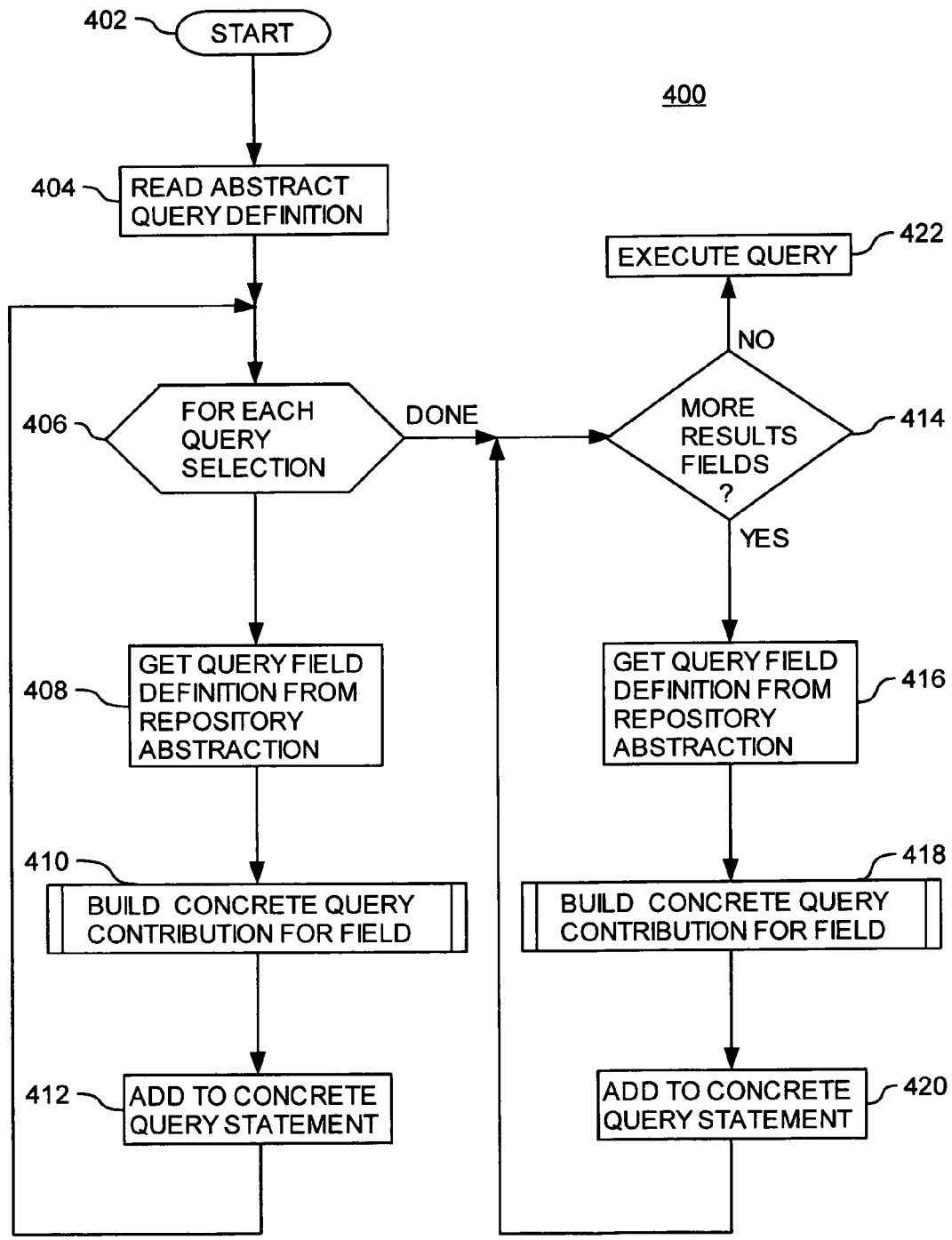
FIGS. 5-6 are flow charts illustrating the operation of a runtime component, according to one embodiment of the invention.

Referring now to FIG. 5, an illustrative runtime method 400 exemplifying one embodiment of the operation of the runtime component 294 of FIG. 2 is shown. The method 400 is entered at step 402 when the runtime component 294 receives as input an abstract query (such as the abstract query shown in Table I). At step 404, the runtime component 294 reads and parses the abstract query and locates individual selection criteria and desired result fields. At step 406, the runtime component 294 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 294 uses the field name from a selection criterion of the abstract query to look up the definition of the field in the data abstraction model 292. As noted above, the field definition includes a definition of the access method used to access the data structure associated with the field. The runtime component 294 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 230 shown in FIG. 2. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 294 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 294 looks up a result field name (from the result specification of the abstract query) in the data abstraction model 292 and then retrieves a result field definition from the data abstraction model 292 to identify the physical location of data to be returned for the current logical result field. The runtime component 294 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 6:
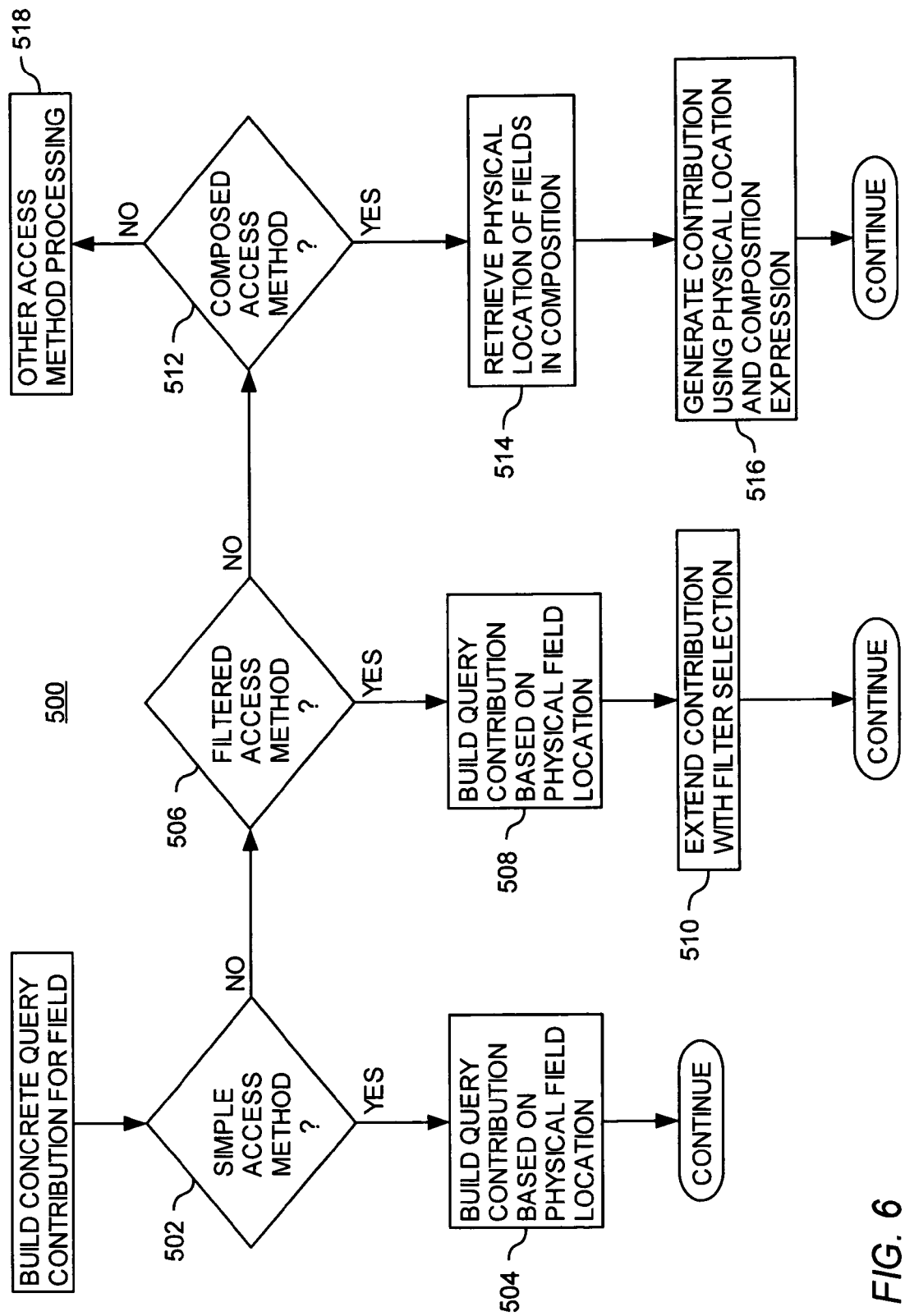

One embodiment of a method 500 for building a concrete query contribution for a logical field according to steps 410 and 418 is described with reference to FIG. 6. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

Processing an Abstract Query and Corresponding Result Data

Figure 7:
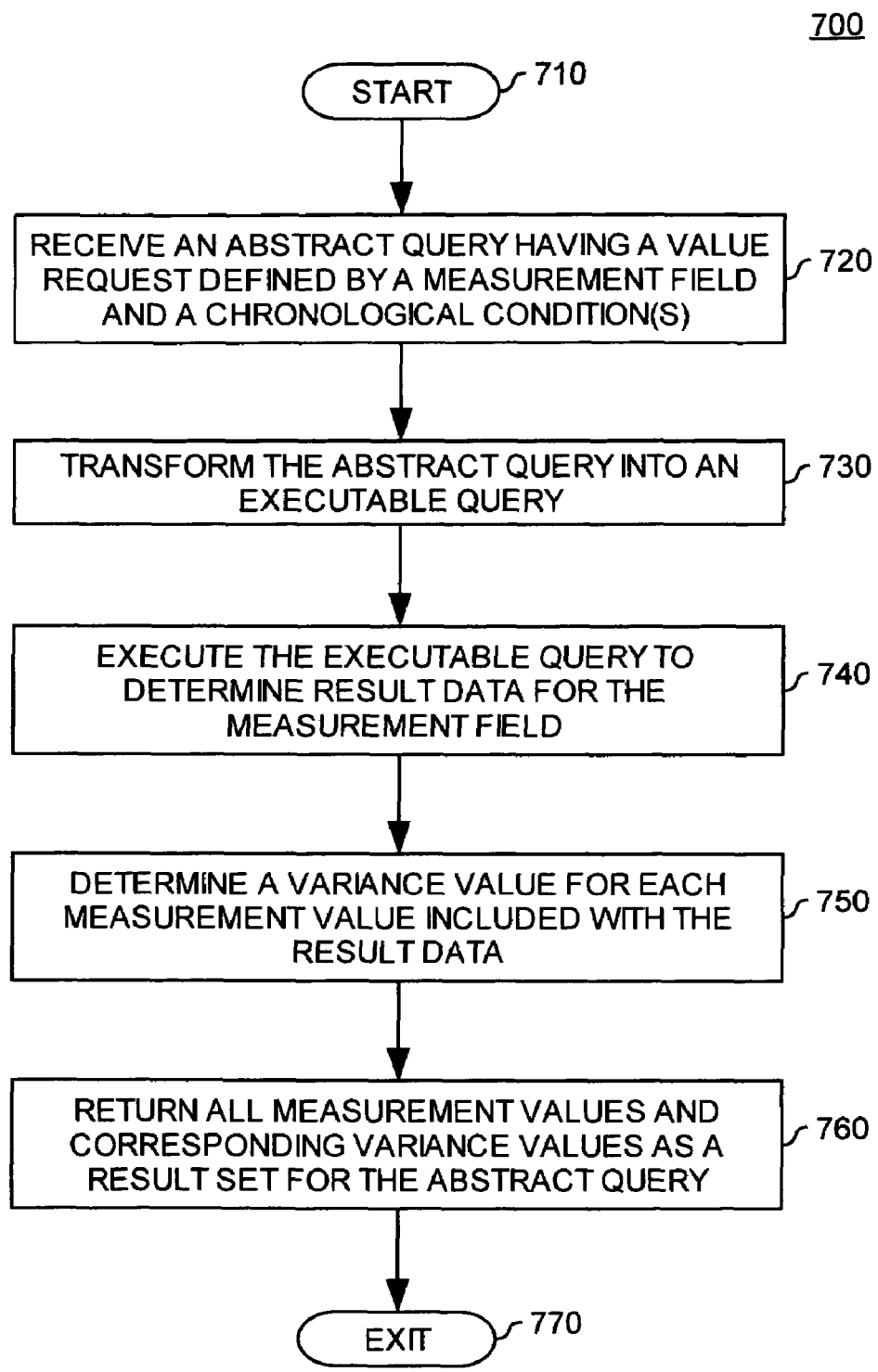
FIG. 7 is a flow chart illustrating a method of generating input to statistical analysis routines on the basis of a query result in one embodiment.

Referring now to FIG. 7, one embodiment of a method 700 for managing execution of an abstract query against an underlying database (e.g., database 230 of FIG. 2) in order to generate suitable input to a statistical analysis routine (e.g., statistical analysis routines 298 of FIG. 2) is illustrated. In one embodiment, at least part of the steps of the method 700 are performed by the query execution unit 236 and/or the output formatter 280 of FIG. 2. Furthermore, at least several steps of the method 700 can be performed on the basis of user input received via the user interface 210 of FIG. 2. Method 700 starts at step 710.

At step 720, an abstract query (e.g., abstract query 260 of FIG. 2) having a value request (e.g., value request 262 of FIG. 2) defined by one or more measurement fields and at least one chronological condition is received. The abstract query is configured for execution against an underlying database(s) in order to retrieve at least one measurement value for a given measurement field. The at least one measurement value should have been taken at a point in time that satisfies a chronological condition that is associated with the given measurement field. By way of example, the following steps of the method 700 are described with reference to an abstract query issued by a user using the user interface 210 of FIG. 2.

For instance, assume a researcher of a medical institution who performs a study on a drug X that is administered to patients having a particular type of a malignant brain tumor. The researcher performs the study in order to determine the efficiency of the administered drug X which is presumed to reduce the particular type of brain tumor. Accordingly, the researcher requires measurement values of the tumor size of each patient which were taken at predefined points in time after administration of the drug X to the patients, e.g., one month, two months, and one year after administration. To this end, in one embodiment the researcher creates an abstract query having a value request defined by the tumor size as measurement field and a sequence of chronological conditions for the measurement field which are satisfied by the predefined points in time. An exemplary abstract query is shown in Table III below, which, for simplicity, is described in natural language without reference to a particular query language. By way of example, the following steps of the method 700 are described with respect to the exemplary abstract query of Table III.

TABLE III

| ABSTRACT QUERY EXAMPLE |
| --- |
| 001 FIND |
| 002    ID, Name |
| 003 WHERE |
| 004    Drug X is administered |
| 005 WITH MEASUREMENTS |
| 006    Tumor Size (beginning of treatment) |
| 007    Tumor Size (beginning of treatment + 1 month) |
| 008    Tumor Size (beginning of treatment + 2 months) |
| 009    Tumor Size (beginning of treatment + 1 year) |

Illustratively, the exemplary abstract query shown in Table III is designed to retrieve patient information (lines 001-002) from an underlying database(s) for patients who are treated with drug X (lines 003-004). The requested patient information consists of a unique patient identifier ("ID" in line 002) and a name ("Name" in line 002) for each patient. The exemplary abstract query of Table III further includes the value request (e.g., value request 262 of FIG. 2) in lines 005-009, which is designed to retrieve measurement values for tumor sizes of each patient. To this end, the value request associates in lines 006-009 a single measurement field ("Tumor Size") with four different chronological conditions ("beginning of treatment", "beginning of treatment+1 month", "beginning of treatment+2 months" and "beginning of treatment+1 year"). Accordingly, each chronological condition is satisfied by a point in time which relates to a specific event that depends on the beginning of the treatment with drug X.

It should be noted that in embodiments of the invention the specific event is not necessarily related to the measurement field. For instance, assume a measurement field having weight values for female patients. Assume further a chronological condition which is satisfied by a point in time that is defined by birth of a first child of each female patient. Accordingly, associating the measurement field with the chronological condition would result in a value request such as "weight (date of birth of first child)". However, the date of birth of the first child is not related to the weight of the patients. Furthermore, the specific event can be a user-provided value, such as a particular date (e.g., "Jan. 15, 2005") or a variable parameter, as in the given example. If the specific event is a variable parameter, a corresponding reference value can be determined during query execution for each retrieved data record. In other words, in the given example a reference value defining the "beginning of treatment" is determined for each patient from the underlying database(s) during execution of the abstract query of Table III. As the treatment for different patients may begin at different points in time, this allows to determine an individual reference value for each patient, as described in more detail below. Moreover, it should be noted that the exemplary abstract query of Table III illustratively associates the "tumor size" measurement field with four different chronological conditions. Alternatively, different queries can be created, each associating the measurement field with a single chronological condition. Accordingly, all such different implementations are broadly contemplated.

At step 730, the abstract query of Table III is transformed into an executable query. An exemplary method for transforming an abstract query into an executable query is described above with reference to FIGS. 5-6. For simplicity, the executable query in the given example is not described in more detail.

At step 740, the executable query is executed against the underlying database(s) to determine result data. In the given example, the executable query is executed against database tables "Demographics", "Treatment Starts" and "Measurements". The database tables are identified using a corresponding data abstraction model (e.g., data abstraction model 292 of FIG. 2) used for transforming the exemplary abstract query of Table III into the executable query. An exemplary database table "Demographics" is shown in Table IV below.

TABLE IV

EXEMPLARY DATABASE TABLE "DEMOGRAPHICS"

| 001 | ID | Name | Age | State |
|---|---|---|---|---|
| 002 | 1 | Sandy | 24 | CA |
| 003 | 2 | Jim | 54 | TX |
| 004 | 3 | Kris | 49 | NJ |

As can be seen from Table IV, the "Demographics" table illustratively contains ID, Name, Age and State information about each patient. The ID information includes identifiers which uniquely identify each patient. Accordingly, the ID information is used in the given example to link the "Demographics" table to the "Treatment Starts" and "Measurements" tables. An exemplary database table "Treatment Starts" is shown in Table V below.

TABLE V

EXEMPLARY DATABASE TABLE "TREATMENT STARTS"

| 001 | Patient_ID | Date | Injected Drug |
|---|---|---|---|
| 002 | 1 | Jan. 5, 2004 | X |
| 003 | 3 | Jan. 7, 2004 | Z |
| 004 | 2 | Feb. 8, 2004 | X |
| 005 | 1 | Feb. 1, 2004 | V |
| 006 | 2 | Mar. 14, 2004 | V |
| 007 | 3 | Jul. 7, 2004 | Y |

As can be seen from Table V, the "Treatment Starts" table illustratively includes three columns: Patient_ID, Date and Injected Drug. The Patient_ID column contains patient identifiers which correspond to identifiers of the ID column in the "Demographics" table to uniquely identify a treatment start for each patient. The Injected Drug column contains information about drugs which were administered to patients and the Date column includes timestamps which specify dates of administration of drugs. For instance, according to line 002 of Table V, the drug "X" was administered on Jan. 5, 2004 ("1/5/04") to a patient having the unique identifier "1". As can be seen from line 002 of Table IV, the patient with the unique identifier "1" is the 24-year old Sandy from California.

For simplicity, it is assumed that the dates of administration of each drug in the exemplary "Treatment Starts" table of Table V define the beginning of corresponding treatments. Accordingly, on Jan. 5, 2004, Sandy's treatment with drug "X" was started with administration of drug X. However, other implementations are possible. For instance, assume that a given drug is administered repeatedly. In this case, the "Treatment Starts" table may only contain the date where the given drug is administered the first time, i.e., the beginning of the treatment. Alternatively, all administration dates can be stored in a single table, but the beginning of the treatment is labeled, e.g., by a corresponding flag. Or, the first date of occurrence of the given drug in the single table is considered to be the beginning date. All such implementations are broadly contemplated.

As was noted above, the exemplary abstract query of Table III is designed to retrieve tumor sizes of patients which were treated with drug X. As can be seen from the "Treatment Starts" table of Table V, the patients having the identifiers "1" and "2" were administered drug X (lines 002 and 004). As was noted above, the patient with the identifier "1" is Sandy from California. Furthermore, as can be seen from line 003 of Table IV, the patient with the unique identifier "2" is the 54-year old Jim from Texas. Illustratively, Sandy and Jim were administered drug "V" (lines 005-006 of Table V) subsequent to the administration of drug X. However, in the given example it is assumed that drug V has no influence on Sandy's and Jim's brain cancer treatment with drug X. In other words, as the researcher's study focuses on drug X, the beginning of the treatment with drug X is essential in the given example, while administration and beginning of the treatment with drug V is not considered relevant. Furthermore, it can be seen from Table V that a patient having the unique identifier "3" is not treated with drug X. Accordingly, all information related to this patient is not relevant for the researcher's study, i.e., the exemplary abstract query of Table III.

Assume now that measurements of tumor sizes, which were performed on the patients at the date of and subsequent to administration of corresponding drugs to monitor progress of the brain cancers, are stored in the "Measurements" table. An exemplary database table "Measurements" is shown in Table VI below.

TABLE VI

EXEMPLARY DATABASE TABLE "MEASUREMENTS"

| 001 | Patient_ID | Date | Tumor Size |
|---|---|---|---|
| 002 | 1 | Jan. 5, 2004 | 20 |
| 003 | 3 | Jan. 7, 2004 | 18 |
| 004 | 2 | Feb. 8, 2004 | 12 |
| 005 | 1 | Feb. 1, 2004 | 18 |
| 006 | 2 | Mar. 14, 2004 | 11 |
| 007 | 1 | Mar. 12, 2004 | 16 |
| 008 | 2 | Apr. 6, 2004 | 10 |
| 009 | 3 | Jul. 7, 2004 | 8 |
| 010 | 3 | Jan. 7, 2005 | 3 |
| 011 | 1 | Feb. 4, 2005 | 3 |
| 012 | 2 | Mar. 3, 2005 | 4 |

As can be seen from Table VI, the "Measurements" table illustratively includes three columns: Patient_ID, Date and Tumor Size. The Patient_ID column contains patient identifiers which correspond to identifiers of the ID column in the "Demographics" table. The Tumor Size column contains test results which were obtained by performing tests on the patients which are suitable to measure the size of their brain tumors. In other words, the Tumor Size column contains measurement values for the tumor sizes of the patients. The Date column includes timestamps wich specify dates at which the test results were determined. For instance, according to line 002 of Table VI, the tumor size of Sandy was "20" on Jan. 5, 2004 ("1/5/04").

In response to execution of the executable query against the exemplary database tables of Tables IV-VI, result data for the result fields (line 001-002 of Table III) and the value request (lines 005-009 of Table III) of the exemplary abstract query of Table III is retrieved. The result data includes all data records in the "Demographics" table of Table IV and the "Measurements" table of Table VI, which are related to the patient identifiers "1" and "2", i.e., to the patients Sandy and Jim. As was noted above, the value request of the exemplary abstract query of Table III requests for measurement values which were taken at the beginning of the treatment, one month later, two months later and one year later. However, as can be seen from lines 002, 005, 007 and 011 and lines 004, 006, 008 and 012 of the exemplary "Measurements" table of Table VI, the tumor sizes of Sandy and Jim were not determined exactly at the requested points in time. In other words, the tumor sizes of Sandy and Jim were measured at points in time which differ from the requested points in time which satisfy the chronological conditions of lines 006-009 of the exemplary abstract query of Table III. By way of example, Sandy's initial measurement was performed at the beginning of Sandy's treatment on Jan. 5, 2004, and the next measurement is from Feb. $1^{st}$, 2004 ("2/1/04" in line 005 of Table VI). Accordingly, the next measurement was performed earlier than one month after the beginning of the treatment.

At step 750, a variance value is calculated for each tumor size measurement value which is retrieved for Sandy and Jim from the exemplary "Measurements" table of Table VI. For a given measurement value which was taken at a given point in time, the variance value defines a time variance between the given point in time and the requested point in time that satisfies a corresponding chronological condition of the exemplary abstract query of Table III. In the example described above, the measurement of Sandy's tumor size from Feb. 1, 2004, was taken four days before Feb. 5, 2004. Accordingly, the variance value "−4" is calculated (February $1^{st}$-February 5) which indicates that the measurement value was taken four days before one month after the beginning of the treatment, as requested by the chronological condition in line 007 of the exemplary abstract query of Table III. An exemplary method for determining the variance values is described in more detail below with reference to FIG. 8.

At step 760, the result data and all calculated variance values for the measurement values that are included with the result data are returned as a result set (e.g., result set 282 of formatted result set 284 of FIG. 2) for the exemplary abstract query of Table III. An exemplary result set in tabular form which is obtained in the given example is shown in Table VII below.

TABLE VII

EXEMPLARY RESULTS TABLE

| 001 | ID | Name | M0 | TV0 | M1 | TV1 | M2 | TV2 | M3 | TV3 |
|---|---|---|---|---|---|---|---|---|---|---|
| 002 | 1 | Sandy | 20 | 0 | 18 | −4 | 16 | 7 | 3 | 30 |
| 003 | 2 | Jim | 12 | 0 | 11 | 6 | 10 | −2 | 4 | 23 |

As can be seen from Table VII, the exemplary results table illustratively contains ID and Name information for each patient who was treated with drug X according to lines 002 and 004 of Table V above. The exemplary results table further includes four measurement values ("M0", "M1", "M2" and "M3") of tumor sizes for each patient as requested in lines 006-009 of the exemplary abstract query of Table III. Moreover, the exemplary results table includes a variance value ("TV0", "TV1", "TV2" and "TV3") for each measurement value. By way of example, as was noted above the variance value "−4" ("TV1" in line 002 of Table VII) indicates that the associated measurement value "18" ("M1" in line 002 of Table VII) was taken four days earlier than the requested point in time that satisfies the chronological condition of line 007 of the exemplary abstract query of Table III.

The variance values can be used in a suitable regression equation of the underlying statistical analysis routine(s) in order to determine approximated values for the tumor sizes with respect to the requested points in time that satisfy the chronological conditions of the exemplary abstract query of Table III. Thus, the underlying statistical analysis routine(s) can take into account how inaccurate each tumor size in the exemplary results table of Table VII is with respect to the requested points in time. For instance, knowing that Sandy's tumor size "18" was measured four days earlier than a requested point in time, it can be determined that one month after the beginning of the treatment the actual tumor size was approximately "17.7" instead of "18". Alternatively, in one embodiment the underlying statistical analysis routine(s) uses each variance value as a factor for determining a weight for the associated tumor size. For instance, a given variance value can be used as weight for weighting the associated tumor size in order to give more or less weight to the associated tumor size, thereby taking the inaccuracy of the associated tumor size into account. All such implementations are broadly contemplated. Method 770 then exits at step 770.

Figure 8:
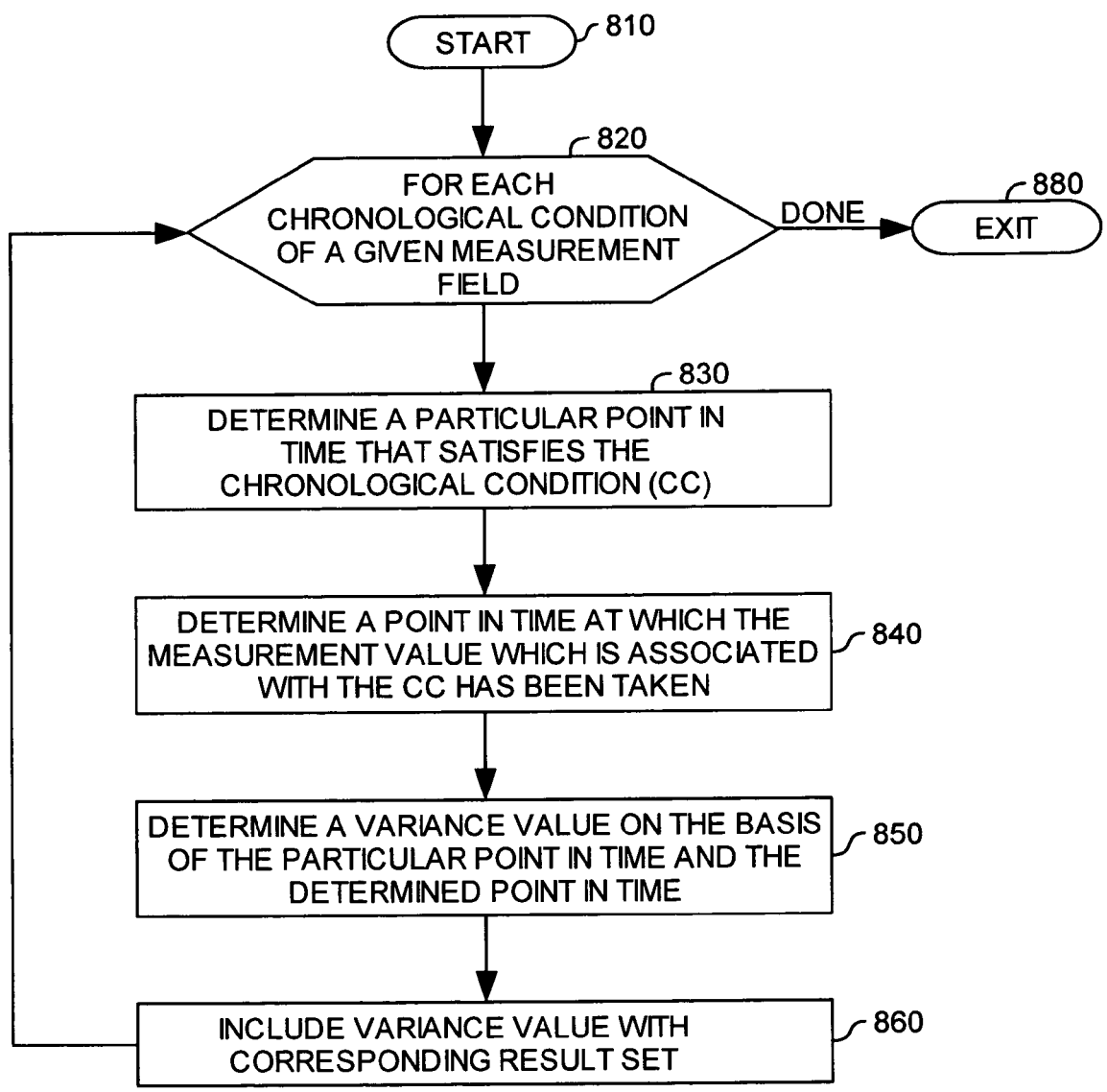
FIG. 8 is a flow chart illustrating a method of determining variance values in one embodiment.

Referring now to FIG. 8, an exemplary method 800 for determination of variance values for a given measurement field (e.g., the "Tumor Size" measurement field of the exemplary abstract query of Table III) is illustrated. According to one aspect, method 800 is entered from step 750 of FIG. 7. At least a portion of the steps of method 800 is performed using the variance calculator 270 of FIG. 2 or another suitable component (e.g., query engine 234 of FIG. 2). By way of example, calculation of variance values is described in the following with reference to the exemplary abstract query of Table III and the exemplary database tables of Tables IV-VI above.

In the given example, method 800 is separately performed for each data record which is to be included with a corresponding result set (e.g., exemplary results table of Table VII) for the exemplary abstract query of Table III. Accordingly, in the given example method 800 is separately performed for each patient. In other words, the method 800 is performed for all measurement values retrieved for a first patient, then for all measurement values retrieved for a second patient and so on. By way of example, assume that in the given example the method 800 is first performed on all measurement values which are retrieved for the patient "Sandy". Method 800 starts at step 810.

At step 820, a loop consisting of steps 820-860 is entered for each chronological condition of the given measurement field. Assume now that in the given example the loop is initially entered at step 820 for the chronological condition defined in line 006 of the exemplary abstract query of Table III, i.e., "beginning of treatment".

At step 830, a particular point in time is determined which satisfies the chronological condition. In the given example, the particular point in time is defined by the date at which Sandy's treatment with drug X was started. This date is determined from the exemplary "Treatment Starts" table of Table V. As was noted above, according to line 002 of Table V Sandy's treatment with drug X was started on Jan. 5, 2004 ("1/5/04"). In the given example, this particular point in time defines a reference value for all other chronological conditions of the given measurement field, as explained in more detail below.

At step 840, a point in time is determined for a given measurement value which was retrieved for the given measurement field with respect to the chronological condition. In the given example, this point in time is Jan. 5, 2004, where an initial tumor size of "20" was measured for Sandy according to line 002 of the exemplary "Measurements" table of Table VI.

At step 850, a variance value defining the time variance between the determined point in time and the particular point in time is calculated. As in the given example both points in time are equal, the calculated variance value is "0".

At step 860, the calculated variance value is included with a corresponding result set (e.g., result set 282 or formatted result set 284 of FIG. 2). Processing then returns to step 820, where the loop consisting of steps 820-860 is entered for a next chronological condition of the given measurement field.

In the given example, the loop is re-entered at step 820 for the chronological condition defined in line 007 of the exemplary abstract query of Table III, i.e., "beginning of treatment+1 month". In this case, the particular point in time that satisfies the chronological condition corresponds to the reference value with a time offset of one month. Accordingly, at step 830 the particular point in time "Feb. 5, 2004", which corresponds to "Jan. 5, 2004+1 month", is determined for the chronological condition defined in line 007 of the exemplary abstract query of Table III. Then, according to line 005 of the exemplary "Measurements" table of Table VI, the point in time "Feb. 1, 2004" is determined at step 840 for the measurement value "18" which is identified with respect to this chronological condition. At step 850, the time variance "−4" is calculated as variance value for the measurement value "18" as described above and included with the result set at step 860.

Accordingly, the loop consisting of steps 820-860 is performed until all variance values associated with measurement values for Sandy's tumor size were calculated. Method 800 then exits at step 880.

As was noted above, the method 800 is subsequently performed on all measurement values which are retrieved for the patient "Jim". As in the given example only measurement values of Sandy and Jim are retrieved, the method 800 is only performed twice to calculate all variance values included with the exemplary result table of Table VII. However, in general method 800 is performed as often as necessary to determine all variance values which are required for a given result set.

It should be noted that the method 800 merely represents one possible implementation of a method for calculating variance values for underlying measurement values. More specifically, as was noted above with reference to FIG. 2, in one embodiment the result set 282 is created as a temporarily stored data object having a timestamp for each measurement value. In this case, instead of performing method 800 sequentially for each patient, variance values for a given measurement field can be calculated with respect to a given chronological condition for all patients before calculating the variance values for all patients with respect to a next chronological condition. Such calculations can be performed in an underlying database (i.e., exemplary database tables of Tables IV-VI above) using SQL, for instance. All such different implementations are broadly contemplated.

Defining a Timeline Using Chronological Conditions

Figure 9:
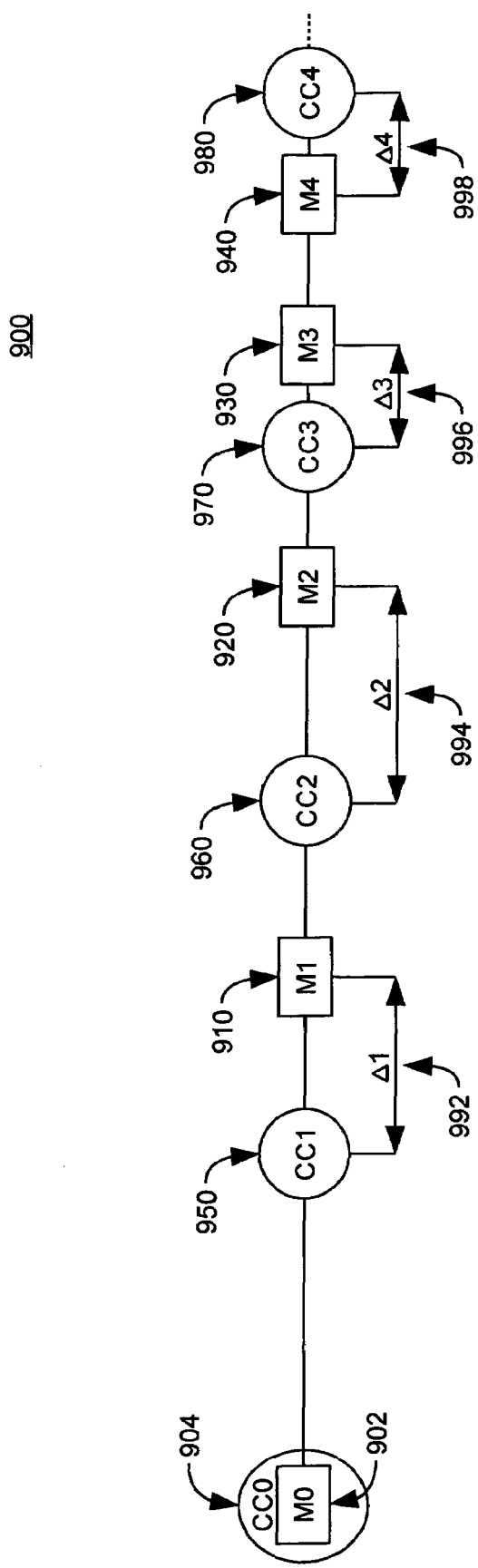
FIG. 9 is an exemplary timeline showing a plurality of chronological conditions in one embodiment.

Referring now to FIG. 9, an exemplary timeline 900 is illustrated. By way of example, the timeline 900 is defined by a plurality of particular points in time which satisfy underlying chronological conditions, such as the chronological conditions in lines 006-009 of the exemplary abstract query of Table III.

Illustratively, the timeline 900 is defined by five particular points in time 904, 950, 960, 970 and 980, each satisfying one of five underlying chronological conditions "CC0", "CC1", "CC2", "CC3" and "CC4". By way of example, assume that the chronological condition CC0 is satisfied by the point in time 904 which is defined by a "beginning of treatment". Assume further that: (i) CC1 is satisfied by the point in time 950 which is defined by "beginning of treatment+1 month", (ii) CC2 is satisfied by the point in time 960 which is defined by "beginning of treatment+2 months", (iii) CC3 is satisfied by the point in time 970 which is defined by "beginning of treatment+3 months", and (iv) CC4 is satisfied by the point in time 980 which is defined by "beginning of treatment+4 months".

As can further be seen from FIG. 9, on the timeline 900 five exemplary points in time 902, 910, 920, 930 and 940, at which underlying measurement values "M0", "M1", "M2", "M3" and "M4" were taken, are shown. Assume that the measurement values M0-M4 were determined for an underlying measurement field, such as the "Tumor Size" field in the exemplary abstract query of Table III. As can be seen from the timeline 900, the measurement value M0 was taken at the point in time 902 which corresponds to the beginning of treatment and, thus, satisfies the chronological condition 904. The measurement value M1 was taken at the point in time 910 which lies between 1 and 2 months after the beginning of the treatment. The measurement value M2 was taken at the point in time 920 which lies between 2 and 3 months after the beginning of the treatment. Finally, the measurement values M3 and M4 were taken at the points in time 930 and 940 which lie between 3 and 4 months after the beginning of the treatment.

As was noted above, for each measurement value a variance value is calculated. To this end, it is assumed that the measurement value M0 was determined with respect to the chronological condition CC0, the measurement value M1 was determined with respect to the chronological condition CC1, the measurement value M2 was determined with respect to the chronological condition CC2, the measurement value M3 was determined with respect to the chronological condition CC3 and the measurement value M4 was determined with respect to the chronological condition CC4. As the measurement value M0 was taken at the beginning of the treatment, which corresponds to the point in time that satisfies the chronological condition CC0, a variance value "0" can be calculated for the measurement value M0. However, for clarity this variance value is not shown in FIG. 9. Furthermore, for the measurement value M1 a variance value 992 "Δ1" is calculated as described above with reference to FIG. 8. Moreover, a variance value 994 "Δ2" is calculated for the measurement value M2, a variance value 996 "Δ3" is calculated for the measurement value M3 and a variance value 998 "Δ4" is calculated for the measurement value M4.

It should be noted that the point in time 910 at which the measurement value M1 was taken is equidistant to the points in time 950 and 960 that satisfy the chronological conditions CC1 and CC2. It should further be noted that the point in time 920 at which the measurement value M2 was taken is closer to the point in time 970 that satisfies the chronological condition CC3 than the point in time 960 that satisfies the chronological condition CC2. Thus, suitable rules are required in order to define which measurement value should be associated to which chronological condition. In the given example, the measurement value M0 is associated with the chronological condition CC0 and a suitable rule may define that each subsequent measurement value is associated with a corresponding subsequent chronological condition. Accordingly, the associations described above are obtained. Alternatively, a given rule may specify that each measurement value should be associated with a chronological condition that is satisfied by a point in time which follows the point in time at which the measurement value was taken. In other words, any possible rule which is suitable to determine associations between chronological conditions and available measurement values is broadly contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method of generating input to statistical analysis routines after execution of a query against a database, comprising:
   receiving an abstract query against a database, the abstract query comprising a value request defined by a measurement field and a chronological reference condition, and configured to return at least one measurement value taken for the measurement field at a point in time that satisfies the chronological reference condition; wherein the measurement field comprises a result field for which data values determined at different points in time are collected;
   transforming the abstract query into an executable query to be executed by a query engine;
   executing the executable query a plurality of times, whereby result data is retrieved including a plurality of previously stored measurement values for the measurement field, each measurement value having been taken at another point in time different from the point in time that satisfies the chronological reference condition;
   for each of the retrieved measurement values, determining and storing in a data field in association with the retrieved measurement value a variance value, wherein the variance value is the time difference between the point in time that satisfies the chronological reference condition and the other point in time at which the retrieved measurement value was taken; and
   returning, as a result set for the abstract query, the data field comprising the retrieved measurement values and the associated variance values for each of the retrieved measurement values.

2. The method of claim 1, wherein the abstract query does not explicitly reflect a request for the variance value.

3. The method of claim 1, further comprising:
   inputting the a given retrieved measurement value and the respective variance value into one of the statistical analysis routines, the analysis routine being configured to determine how inaccurate each given retrieved measurement value is with respect to the chronological reference condition while performing the statistical analysis.

4. The method of claim 1, wherein each measurement value defines a test result being obtained in response to execution of an underlying test; and the point in time that satisfies the chronological reference condition defines a requested execution time for the underlying test with respect to each test result.

5. The method of claim 1, wherein the measurement field is associated with a plurality of chronological conditions, each being satisfied by a particular point in time, the plurality of particular points in time defining a timeline.

6. The method of claim 5, wherein each particular point in time differs from the point in time that satisfies the chronological reference condition by a predefined time offset.

7. The method of claim 5, wherein each of the plurality of previously stored measurement values was taken at a point in time which at least approximates one of the particular points in time that satisfies a corresponding one of the plurality of chronological conditions.

8. The method of claim 5, wherein each retrieved measurement value defines a test result being obtained in response to execution of an underlying test; and the point in time that satisfies the chronological reference condition defines a requested execution time for the underlying test with respect to each test result.

9. The method of claim 1, wherein each retrieved measurement field corresponds to a logical field of a data abstraction model abstractly describing the data in the database; and wherein the data abstraction model is adapted for transforming the logical field into a form consistent with a physical representation of the data in the database.

* * * * *